US010389174B2

(12) United States Patent
Itaya et al.

(10) Patent No.: US 10,389,174 B2
(45) Date of Patent: Aug. 20, 2019

(54) RESOURCE MANAGEMENT SYSTEM

(71) Applicant: NATIONAL INSTITUTE OF INFORMATION AND COMMUNICATIONS TECHNOLOGY, Koganei-shi, Tokyo (JP)

(72) Inventors: Satoko Itaya, Koganei Tokyo (JP); Fumihide Kojima, Koganei Tokyo (JP); Hiroshi Harada, Koganei Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 90 days.

(21) Appl. No.: 15/304,753

(22) PCT Filed: Apr. 17, 2015

(86) PCT No.: PCT/JP2015/002127
§ 371 (c)(1),
(2) Date: Oct. 17, 2016

(87) PCT Pub. No.: WO2015/159555
PCT Pub. Date: Oct. 22, 2015

(65) Prior Publication Data
US 2017/0047775 A1 Feb. 16, 2017

(30) Foreign Application Priority Data
Apr. 18, 2014 (JP) ................................ 2014-086915

(51) Int. Cl.
H02J 13/00 (2006.01)
G06F 1/26 (2006.01)
(Continued)

(52) U.S. Cl.
CPC .......... *H02J 13/0075* (2013.01); *H02J 3/005* (2013.01); *H02J 9/061* (2013.01); *H02J 13/0003* (2013.01);
(Continued)

(58) Field of Classification Search
CPC .. H02J 13/0006; H02J 3/46; H02J 3/14; H02J 13/00; G06F 1/26
See application file for complete search history.

(56) References Cited

U.S. PATENT DOCUMENTS 9,013,902 B2     4/2015  Abe
2005/0231869 A1* 10/2005 Yoshikawa ............... H02J 9/06
                                                         361/62

FOREIGN PATENT DOCUMENTS

CN      102484369 A     5/2012
EP        2477297 A1    7/2012
(Continued)

OTHER PUBLICATIONS

International Search Report (ISR) and Written Opinion dated Jun. 30, 2015 issued in International Application No. PCT/JP2015/002127.

(Continued)

Primary Examiner — Rexford N Barnie
Assistant Examiner — Elim Ortiz
(74) Attorney, Agent, or Firm — Holtz, Holtz & Volek PC

(57) ABSTRACT

A resource management system includes first and second opening/closing control mechanisms and a grid manager. The first and second control mechanisms each include: a controller to transmit a signal between a resource supply source and a load, a monitor to monitor a state of a resource from the source, a storage to store a policy defining the signal corresponding to the state of the resource from the source; and a path controller to generate the signal based on
(Continued)

a monitoring result of the monitor and the policy. The grid manager includes: a third monitor to monitor the state of the resource from the first source; and a third path controller to generate at least one of the first and second signals by controlling at least one of the first path and second path controllers based on a monitoring result of the third monitor.

14 Claims, 10 Drawing Sheets

(51) Int. Cl.
    *H02J 3/46*     (2006.01)
    *H02J 3/00*     (2006.01)
    *H02J 9/06*     (2006.01)

(52) U.S. Cl.
    CPC .................. *G06F 1/26* (2013.01); *H02J 3/00* (2013.01); *H02J 13/0079* (2013.01); *Y02B 70/3291* (2013.01); *Y02B 90/222* (2013.01); *Y04S 20/12* (2013.01); *Y04S 20/248* (2013.01)

(56) References Cited

FOREIGN PATENT DOCUMENTS

| JP | 2011061970 A | 3/2011 |
| JP | 2011223852 A | 11/2011 |
| WO | 2004023625 A1 | 3/2004 |

OTHER PUBLICATIONS

T. Takuno, et al, "AC Power Routing System in Home Based on Demand and Supply Utilizing Distributed Power Source", Energies 2011, 4(5), pp. 717-726.

* cited by examiner

FIG.3

| Object Event | Detected Place | Outline of Control | Communication Routing | Important Element (Allowable Delay Time) | Communication Category |
|---|---|---|---|---|---|
| Voltage Sag Occurrence at Plant | SS | Notification from Voltage Sag Detected SS to other SS<br>SS Autonomous Control | Static Routing | Reliability (1 second or less) | SS Independently<br>SS-SS Cooperation |
| | GM | Notification from GM to Subordinate SS<br>SS Autonomous Control | Dynamic Routing | Low Delay (a few seconds to a few minutes) | GM-SS Cooperation |
| Equipment Failure Detection at Plant | SS | Notification from Failure Detected SS to GM<br>Control Instruction from GM to related SS<br>Local Control | Dynamic Routing | Low Delay (a few seconds to a few minutes) | GM-SS Cooperation |
| | GM | Control Instruction from GM to Related SS<br>Local Control | | | |
| Demand Response | GM | Notification from Control Instruction GM to SM<br>Reconstruction by SM<br>Notification to Object GM<br>Control Instruction from Object GM to Subordinate SS<br>Global Control | Dynamic Routing | Congestion Avoidance (a few minutes to several dozen minutes) | GM-GM Cooperation |
| | SM | Reconstruction by SM<br>Notification to Object GM<br>Instruction from Object GM to Subordinate SS<br>Global Control | | | |
| BCP in accordance with production state (including: control based on voltage sag prediction) | SM | Impact Calculation by SM and Notification to Object GM<br>Instruction from Object GM to Subordinate SS<br>Global Control | Dynamic Routing | Prediction/ Cloud Cooperation (a few hours) | GS-SM Cooperation |

RESOURCE MANAGEMENT SYSTEM

TECHNICAL FIELD

The embodiment of the present invention relates to a resource management system.

BACKGROUND

At a production plant or the like, there is a case when the plant is unmanned or automated by installing a just-in-time method and a factory automation system. When the method and system as stated above are installed, it is important to prevent a trouble and a stop of equipment in each process.

As one of causes of trouble occurrence, there can be cited instability of electric power caused by disasters due to daily natural phenomena such as thunderbolt and gust of wind (so-called as an "instantaneous voltage drop (voltage sag)"). As for the instability of the electric power, it has been tried to avoid by duplexing of a power supply path, a backup power supply, and so on.

However, in case of a small-to-medium sized plant, an uninterruptible power supply (UPS) has been installed in order of importance based on analysis of processes in accordance with an averaged operation to save cost and space. Besides, there is a case when turning on/off of the power supply is manually performed based on thunder forecast or the like from the Meteorological Agency.

PRIOR ART DOCUMENT

Patent Document

Patent Document 1: Japanese Patent Application Laid-open No. 2011-061970

Non-Patent Document

Non-Patent Document 1: T. Takuno, Y. Kitamori, R. Takahashi, T. Hikihara, "AC Power Routing System in Home Based on Demand and Supply Utilizing Distributed Power Source", Energies 2011, 4(5), 717-726

SUMMARY OF THE INVENTION

Problems to be Solved by the Invention

In a conventional system which manages a power supply (a resource supply), there are problems in which it is difficult to cover all equipment within a management object due to problems in cost and installation space, and it is difficult to correspond to a dynamic transition of daily production processes and loads. The present invention is made to solve these problems, and an object thereof is to provide a resource management system capable of corresponding to the dynamic transition of load and failure, and managing a lot of equipment in low cost.

Means for Solving the Problems

A resource management system according to the embodiment includes: (1) a first opening/closing control mechanism which includes: a first opening/closing control part which transmits a first opening/closing signal controlling opening/closing of a connection between a first resource supply source and a first load; a first monitoring part which monitors a state of a resource supplied from the first resource supply source; a first storage part which stores a first policy defining the first opening/closing signal corresponding to the state of the resource supplied from the first resource supply source; and a first path control part which generates the first opening/closing signal based on a monitoring result of the first monitoring part and the first policy; (2) a second opening/closing control mechanism which includes: a second opening/closing control part which transmits a second opening/closing signal controlling opening/closing of a connection between a second resource supply source which is different from the first resource supply source and a second load; a second monitoring part which monitors a state of a resource supplied from the second resource supply source; a second storage part which stores a second policy defining the second opening/closing signal corresponding to the state of the resource supplied from the second resource supply source; and a second path control part which generates the second opening/closing signal based on a monitoring result of the second monitoring part and the second policy; and (3) a grid manager which includes: a third monitoring part which monitors the state of the resource supplied from the first resource supply source; and a third path control part which generates at least one of the first and second opening/closing signals by controlling at least one of the first path control part and the second path control part based on a monitoring result of the third monitoring part.

Effect of the Invention

According to the present invention, it is possible to provide a resource management system capable of corresponding to dynamic transition of load and failure, and managing a lot of equipment in low cost.

BRIEF DESCRIPTION OF THE DRAWINGS

FIG. 3 A view explaining an allowable delay time from stop to recovery of power supply.

MODES FOR CARRYING OUT THE INVENTION

A resource management system of the embodiment properly supplies a resource to loads in a plant or the like including a plurality of loads, and performs reconstruction of a supply route of the recourse in accordance with failure occurrence of the resource supply and a prediction thereof. The supply route of the resource is hierarchically controlled in accordance with contents of the failure, and it is possible to flexibly reconstruct the supply route of the resource. In the following description, there is described an example where supply of electric power is managed as the resource at a plant including a plurality of electrical equipment as the loads.

(Configuration of Embodiment)

Figure 1:
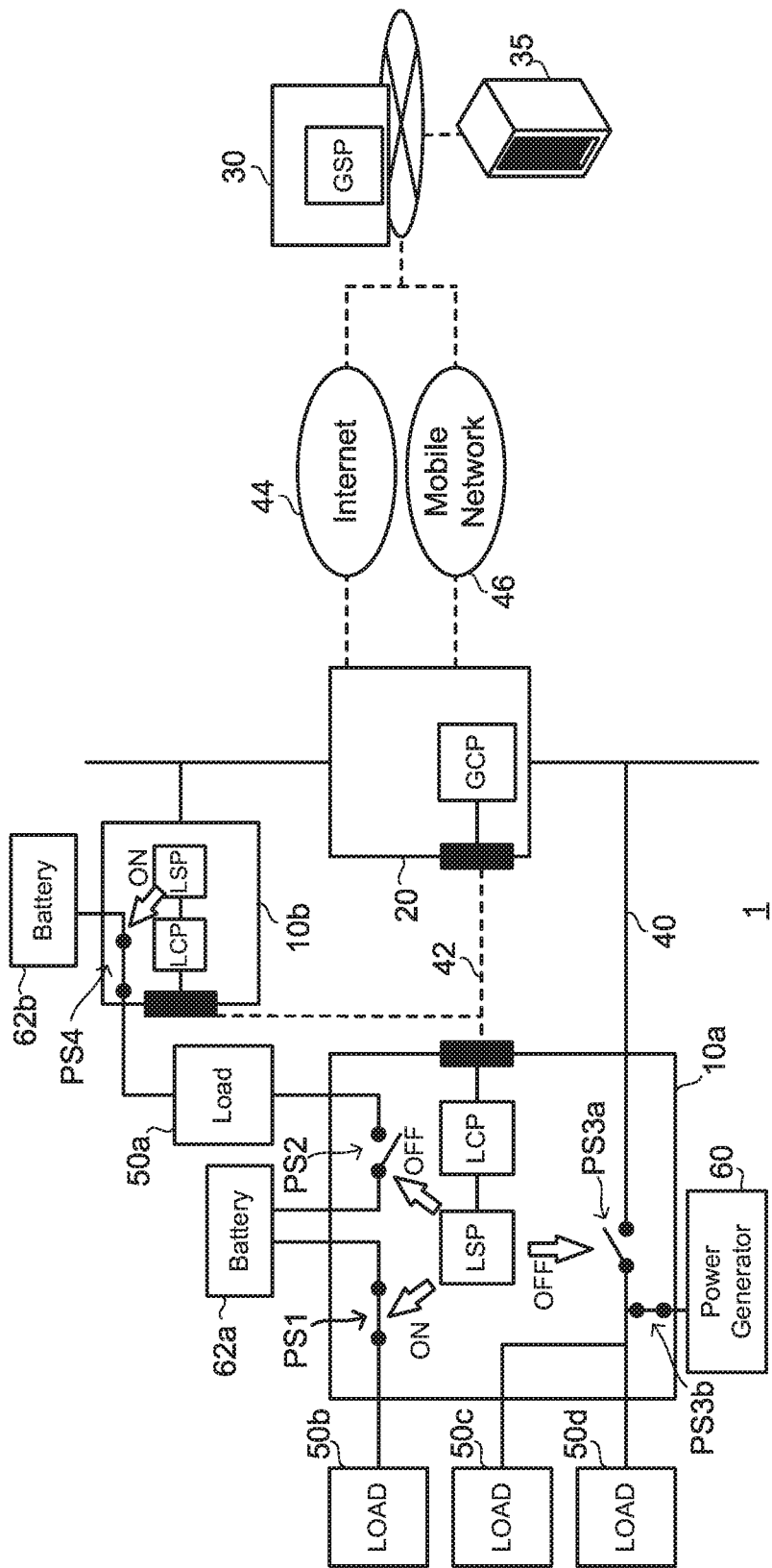
FIG. 1 A view illustrating an outline of a resource management system according to an embodiment.

As illustrated in FIG. 1, a resource management system 1 of the embodiment includes smart switches 10a, 10b, a grid manager 20, and a service manager 30. The smart switches 10a, 10b receive supply of electric power (supply of a resource) through a power line 40, and are connected to the grid manager 20 and other smart switches to be able to communicate with each other through a network 42. The grid manager 20 is connected to the service manager 30 through a plurality of communication paths (internet 44 and a mobile network 46 in an example illustrated in FIG. 1). Note that the resource management system 1 of the embodiment may further be connected to a cloud 35 made up of a server or the like through the internet 44 and the mobile network 46.

The smart switches 10a, 10b each are a switch mechanism which connects or disconnects loads such as electrical equipment and a power supply source as a resource, and an arbitrary number of loads and power supply sources are connected. As illustrated in FIG. 1, loads 50a to 50d are connected to the smart switch 10a, and the power line 40, a power generator 60, and a storage battery 62a are connected as the power supply sources to the smart switch 10a. Besides, the load 50a is connected to the smart switch 10b, and the power line 40 and a storage battery 62b are connected as the power supply sources to the smart switch 10b.

The smart switches 10a, 10b are able to not only turn on/off the power supply to the load, but also select a specific power supply source from among the plurality of power supply sources to connect to an arbitrary load. In the example illustrated in FIG. 1, the smart switch 10a includes physical switches PS1 to PS3b, and the electric power of the power generator 60 is supplied to the loads 50c, 50d, and the electric power of the storage battery 62a is supplied to the load 50b by closing the physical switches PS1 and PS3b and opening the physical switches PS2 and PS3a. Similarly, the smart switch 10b supplies the electric power of the storage battery 62b to the load 50a by closing the physical switch PS4.

The smart switches 10a, 10b each include a local communication policy (LCP) provided from the grid manager 20 and a local service policy (LSP) provided from the service manager in a storage part (not-illustrated) such as a memory. The local communication policy is definition information where communication conditions such as communication paths, communication parameters, destination information used by the smart switch to communicate with exterior are defined for each supposed situation. The local service policy is definition information where the load and the resource (electric energy or the like) to be supplied to the load are defined for each supposed situation. The smart switches 10a, 10b perform switching of the power supply source where delay is not allowed based on the local policy by self judgment, but the switching of the power supply source may be performed based on a later-described instruction of the grid manager 20.

The local communication policy and the local service policy enable cooperative operation among a plurality of smart switches. In the example illustrated in FIG. 1, the smart switch 10a cooperates with the smart switch 10b, and supply the electric power of the storage battery 62b to the load 50a by respectively opening the physical switch PS2 and closing the physical switch PS4. Besides, the local communication policy and the local service policy also enable autonomous operation of one's own smart switch unit. Namely, the smart switch controls the physical switches based on each policy as long as continuous power supply is possible only by the control of the subordinate physical switches. In the example illustrated in FIG. 1, the smart switch 10a controls the physical switches PS3a, PS3b based on the local service policy, and it becomes possible to select either the electric power from the power line 40 or the electric power from the power generator 60, and to supply the electric power for the load 50c and the load 50d.

The smart switches 10a, 10b each also have a function to detect troubles of the power supply source and the load. The smart switches 10a, 10b each are able to control the power supply to the subordinate loads by autonomously controlling the physical switches based on the local service policy when the trouble of the subordinate load is detected.

A plurality of power supply sources and a plurality of loads may be connected to the smart switch such as the smart switch 10a illustrated in FIG. 1, or a single power supply source and a single load may be connected such as the smart switch 10b. A scale and a disposition of the smart switch are able to be set in accordance with a disposition state of the loads, a position of power receiving equipment which receives the power supply, and so on at a plant or the like.

The grid manager 20 is a management device which manages the plurality of smart switches 10a, 10b, and generates the local communication policy held by each smart switch. The grid manager 20 is connected to the plurality of smart switches 10a, 10b through the network 42, and enables the cooperative operation of the plurality of smart switches 10a, 10b. Besides, the grid manager 20 generates the local communication policy by the smart switches 10a, 10b, and provides each smart switch.

The grid manager 20 has a global communication policy (GCP). The global communication policy is definition information where communication paths, communication parameters, destination information, and so on are defined by supposed situations as for the communication with the subordinate smart switches 10a, 10b, the communication between the smart switches 10a, 10b, further, a communication with a superior service manager 30. The global communication policy is self-generated and held by the grid manager 20 in accordance with instruction or the like from the service manager 30.

The grid manager 20 also has a function to detect the troubles of the power supply source and the load as same as the smart switches 10a, 10b. When the grid manager 20 detects the trouble of the power supply source, it is possible to instruct the subordinate smart switches 10a, 10b to change a power supply route based on the grid communication policy.

The service manager 30 is a management device which sets service contents of a whole system by managing the grid manager 20, and generates the local service policy held by each smart switch. The service manager 30 generates the local service policy for each smart switch, and provides each smart switch.

The service manager 30 has a global service policy (GSP). The global service policy is definition information where a reference of the power supply for a whole plant managed by the resource management system 1 is defined. There are contained information such as the information of the load, the information of the electric power necessary for the load, dispositions of the loads and the power supply sources, and so on in the global service policy.

The cloud 35 is an information providing system including a server which provides, for example, meteorological information, a database, and so on. The cloud 35 provides, for example, thunderbolt forecast information or the like to be a cause of the voltage sag to the service manager 30.

Subsequently, a functional configuration of the resource management system 1 according to the embodiment is described in detail with reference to FIG. 2.

Figure 2:
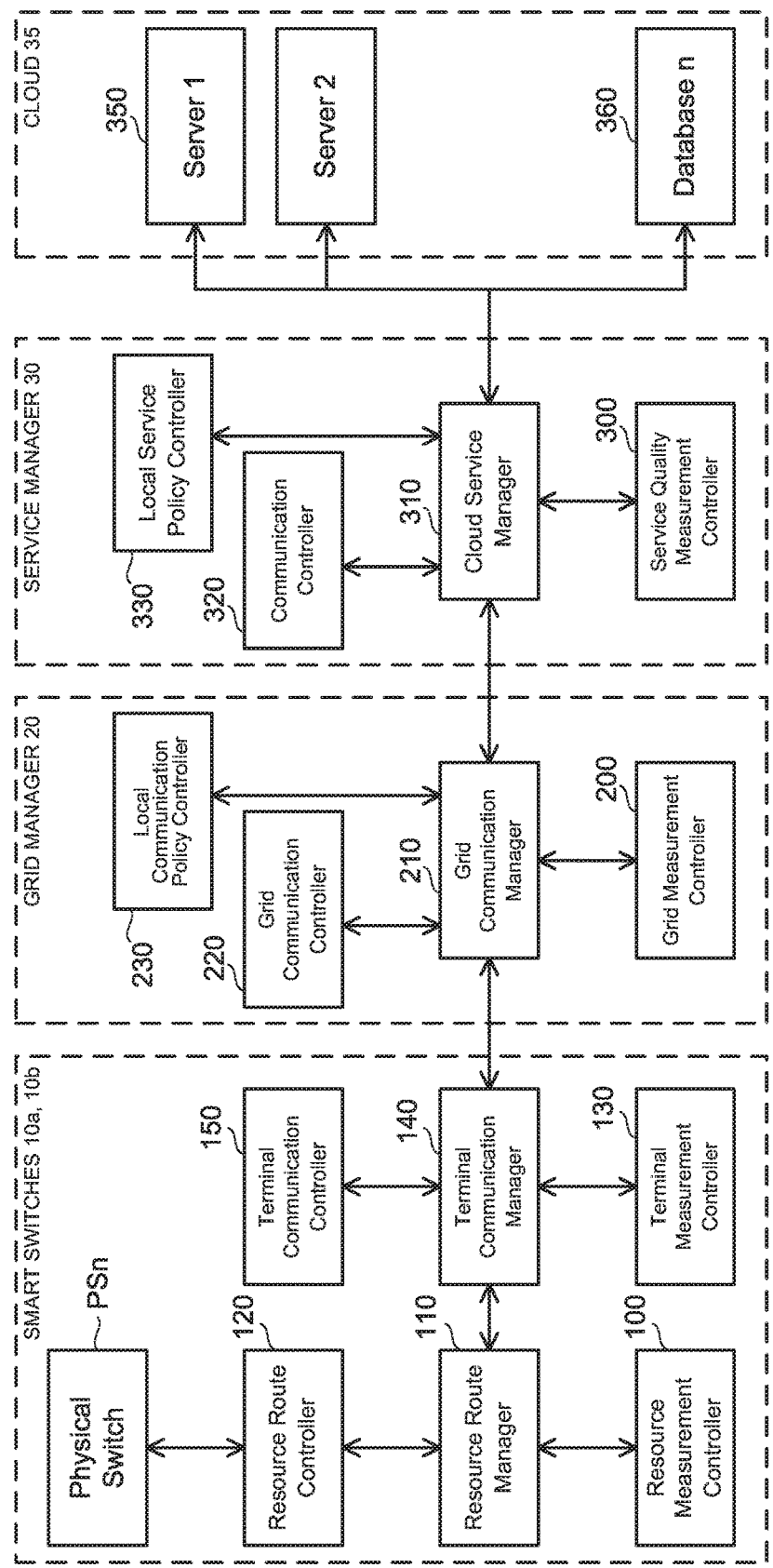
FIG. 2 A block diagram illustrating a functional configuration of the resource management system according to the embodiment.

As illustrated in FIG. 2, the smart switches 10a, 10b of the embodiment each include physical switches PSn, a resource measurement controller 100, a resource route manager 110, and a resource route controller 120.

The resource measurement controller 100 (RMC) collects route determination information such as, for example, load information of the loads 50a to 50d, power generation information including a power generation amount or the like of the power generator 60, and power storage information of the storage batteries 62a, 62b to determine the power supply route, and provides to the resource route manager 110. The resource measurement controller 100 monitors the troubles of the loads and the power supply sources through the collection of these information groups, and notifies the resource route manager 110 of trouble occurrence of the loads and the power supply sources.

The resource route manager 110 (RRM) determines service quality (what kind of power supply is to be performed) at the smart switches 10a, 10b in accordance with the route determination information and the local service policy provided from the service manager 30. Besides, when the resource measurement controller 100 detects the trouble occurrence of the loads and the power supplies, the resource route manager 110 determines to reconstruct the power supply route in accordance with a situation of the trouble.

The resource route controller 120 (RRC) determines a supply route of the electric power being the resource based on the determination of the resource route manager 110. Namely, the resource measurement controller 100, the resource route manager 110, and the resource route controller 120 cooperate with each other to determine the supply route of the resource. Change in the supply route of the electric power is performed by the resource route controller 120 opening/closing controlling each of the subordinate physical switches PSn of the smart switches 10a, 10b by control signals.

Besides, the smart switches 10a, 10b of the embodiment each include a terminal measurement controller 130, a terminal communication manager 140, and a terminal communication controller 150.

The terminal measurement controller 130 (TMC) collects communication control information necessary for communication control, and provides the information to the terminal communication manager 140. The terminal communication manager 140 (TCM) controls communication between the smart switch and exterior based on the local communication policy provided from the grid manager 20. Note that when the resource route manager 110 determines the power supply in cooperation with the other smart switch, the terminal communication manager 140 sets a communication path with the smart switch to be cooperated with based on the local communication policy. The terminal communication controller 150 (TCC) controls communication devices of the smart switches 10a, 10b based on instructions of the terminal communication manager 140 to perform the communication.

Besides, as illustrated in FIG. 2, the grid manager 20 of the embodiment includes a grid measurement controller 200, a grid communication manager 210, a grid communication controller 220, and a local communication policy controller 230.

The grid measurement controller 200 (GMC) acquires communication control information necessary for a communication control with the subordinate smart switches and a communication control with the service manager 30, and provides the information to the grid communication manager 210. In addition, the grid measurement controller 200 also has a function to detect troubles of loads accommodated in the subordinate smart switches and related power supply sources as same as the recourse route manager 110.

The grid communication manager 210 (GCM) monitors a communication state between the smart switches 10a, 10b, a communication state with the smart switches 10a, 10b, and a communication state with the service manager 30, further presence/absence of troubles of the subordinate loads and power supply sources. In addition, the grid communication manager 210 cooperates with the service manager 30, and determines the local communication policy including a communication method, a frequency, and so on. The grid communication controller 220 (GCC) controls a communication method, a communication frequency, and so on regarding the communication with the smart switches 10a, 10b and the service manager 30. The local communication policy controller 230 (LCC) provides the local communication policy to the smart switches 10a, 10b and instructs rewrite thereof.

As illustrated in FIG. 2, the service manager 30 of the embodiment includes a service quality measurement controller 300, a cloud service manager 310, a communication controller 320, and a local service policy controller 330.

The service quality measurement controller 300 (SQC) measures a state of service quality provided by the resource management system 1 of the embodiment, and provides the state to the cloud service manager 310. The cloud service manager 310 (CSM) monitors all of services whether or not a service level defined by a user of the resource management system 1 of the embodiment is maintained. When an allowable delay is changed regarding a resource supply stop time such as a voltage sag, an instantaneous power failure, and so on resulting from a change, a variation, and so on of the loads 50a to 50d connected to the smart switches 10a, 10b, the cloud service manager 310 changes the local service policy of each of the smart switches 10a, 10b, and instructs the grid manager 20 to change the communication policy.

The communication controller 320 (CC) sets a communication method in accordance with the instruction of the grid manager 20 to communicate. The local service policy controller 330 (LSC) instructs changes when the change of the local service policy of each of the smart switches 10a, 10b becomes necessary resulting from the change, the variation, and so on of the loads 50a to 50d.

Further, as illustrated in FIG. 2, the cloud 35 of the embodiment includes a server 350 and a database 360 where information in a field regarding changes of the local communication policy and the local service policy, for example, the meteorological information, production management information, and so on are stored.

As stated above, the resource management system of the embodiment disposes a plurality of smart switches for a management object containing a plurality of loads, and the grid manager which manages the smart switches is hierarchically disposed. According to the configuration as stated above, a flexible resource supply control in accordance with a length of an allowable delay regarding a supply stop time of the resource becomes possible. Namely, the smart switch autonomously changes the supply route based on the local service policy as for correspondence for a voltage sag where there is no time to spare. Besides, the smart switch and the grid manager cooperate, and the supply route is changed for a range over the plurality of smart switches as for the correspondence for a voltage sag prediction when there is relatively time to spare. It is thereby possible to perform a dynamic supply control in accordance with the loads.

Besides, the resource management system of the embodiment includes the service manager which manages the service in addition to the grid manager which manages the smart switches, and therefore it is possible to secure service quality of a whole of the provided system.

Further, the resource management system of the embodiment enables to change the local service policy and the local communication policy being references for the smart switches to perform the resource supply control, and therefore, it is possible to apply for businesses in every mode regardless of the loads of the user being the management object and the disposition thereof. This means that one who has the resource management system of the embodiment is able to provide a resource management service as a cloud service to a user who is difficult to have the resource management system on one's own account.

(Allowable Delay from Resource Supply Stop to Recovery)

Here, an allowable delay time from a stop of the power supply to the load to recovery is described with reference to FIG. 3.

It is general that it takes a certain period of time from the stop of the resource supply such as the electric power due to failure to the recovery. On the other hand, there are various ones in the electric equipment being the loads from one where any delay is not allowed to one where a certain degree of delay is allowed depending on states thereof. For example, as illustrated in FIG. 3, voltage sag occurrence at a plant is an event directly linked to quality and reliability of products, and therefore, recovery within one second or less is desired. In case of equipment failure at the plant, it is important to prevent an effect on other equipment, and the recovery within a delay from a few seconds to a few minutes is allowed. Further, in events such as smoothing of the power supply, and demand regulation of the power supply by each equipment in the plant, they are issues occurring in daily business, so it is possible to prepare in advance, and therefore, the delay for approximately a few minutes to several dozen minutes may be allowed. In an event to predict a time of a thunder disaster and to change the power supply route in advance, it is carried out based on a precise plan, and therefore, delay for a few hours may be allowed.

Besides, difference in the allowable delay time relates to a range where the effects of the troubles of the loads and the power supplies are exerted. For example, in the case of the voltage sag occurrence at the plant, the allowable delay time is short, and therefore, autonomous recovery by each smart switch is a principle. On the other hand, in the case of the equipment failure occurrence at the plant, the allowable delay time is longer than the voltage sag occurrence, but the effect of the trouble is exerted on a wide range, and therefore, the cooperative recovery of the grid manager and the smart switches is requisite.

Various states of the power supply such as the voltage sag occurrence, the equipment failure, and so on are classified based on the allowable delay time from the stop to the recovery of the power supply (allowable time for opening/closing of switches), and a table where each change method of the power supply route (a combination method of the opening/closing of the switches) suitable for each state is corresponded is stored as the local service policy at a storage part of each of the smart switches and the grid manager. In an example illustrated in FIG. 3, there are illustrated the supply route changes where the voltage sag occurrence and the equipment failure at the plant, a demand response with a time margin, further, the voltage sag caused by thunder or the like is predicted as the states of the power supply. Then an independent autonomous control of the smart switch, a cooperative control of the smart switches with each other, a local control where the grid manager and the smart switch cooperate, further a global control where the grid managers cooperate with each other, and so on are defined as actions with correspond to each state (prediction). The resource management system of the embodiment includes the smart switches which directly control the power supply to the loads, the grid manager which comprehensively manages the plurality of smart switches, and the service policy table as illustrated in FIG. 3, and therefore, the recovery in cooperation with the other smart switches is enabled in addition to the autonomous recovery of the power supply route.

(Operation Example 1 of Embodiment: Smart Switch Detects Trouble)

Figure 4:
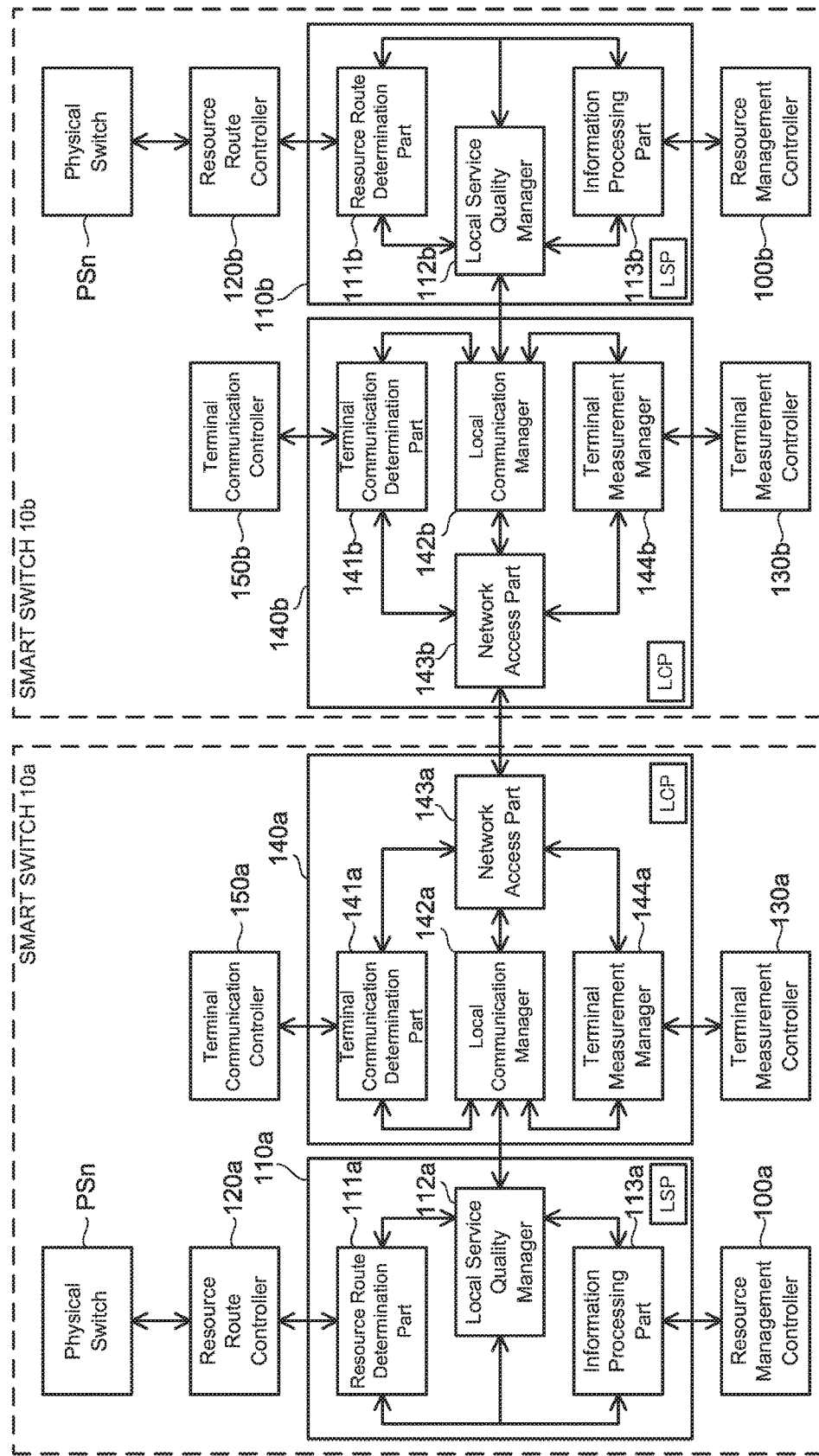
FIG. 4 A block diagram illustrating a functional configuration at a communication time between smart switches.

Hereinafter, operations of the resource management system of the embodiment are described with reference to FIG. 4. As illustrated in FIG. 4, resource route managers 110a, 110b respectively include resource route determination parts 111a, 111b, local service quality managers 112a, 112b, and information processing parts 113a, 113b. Besides, terminal communication managers 140a, 140b respectively include terminal communication determination parts 141a, 141b, local communication managers 142a, 142b, network access parts 143a, 143b and terminal measurement managers 144a, 144b.

When the resource measurement controller 100a detects the voltage sag at the load 50c, a detection result is transmitted to the information processing part 113a of the resource route manager 110a.

The local service quality manager 112a of the resource route manager 110a notifies the voltage sag occurrence to the grid manager 20 and the smart switch 10b through the local communication manager 142a of the terminal communication manager 140a based on the local service policy.

The resource route determination part 111a determines detachment of a power supply source (for example, the power line 40) being the occurrence cause of the voltage sag based on the local service policy, and notifies the resource route controller 120a.

The resource route controller 120a opens the physical switch PS3a and closes the physical switch PS3b in accordance with the notification to switch the power supply to the load 50c from the power line 40 to the power generator 60.

The resource route determination part 111a cooperates with the other smart switch 10b in accordance with an instruction from the local service quality manager 112a, and determines the power supply route preparing for the voltage sag occurrence. As stated above, according to the resource management system of the embodiment, the control of the physical switches which is detected by the smart switch and requires low delay is enabled by the smart switch by itself, but the control of the physical switches may be enabled in cooperation with the other smart switch. The cooperative control in this case may be enabled by the smart switches performing cooperative operation through the grid manager at a superior position, or by the smart switches directly performing the cooperative operation.

(Operation Example 2 of Embodiment: Grid Manager Detects Trouble)

Figure 5:
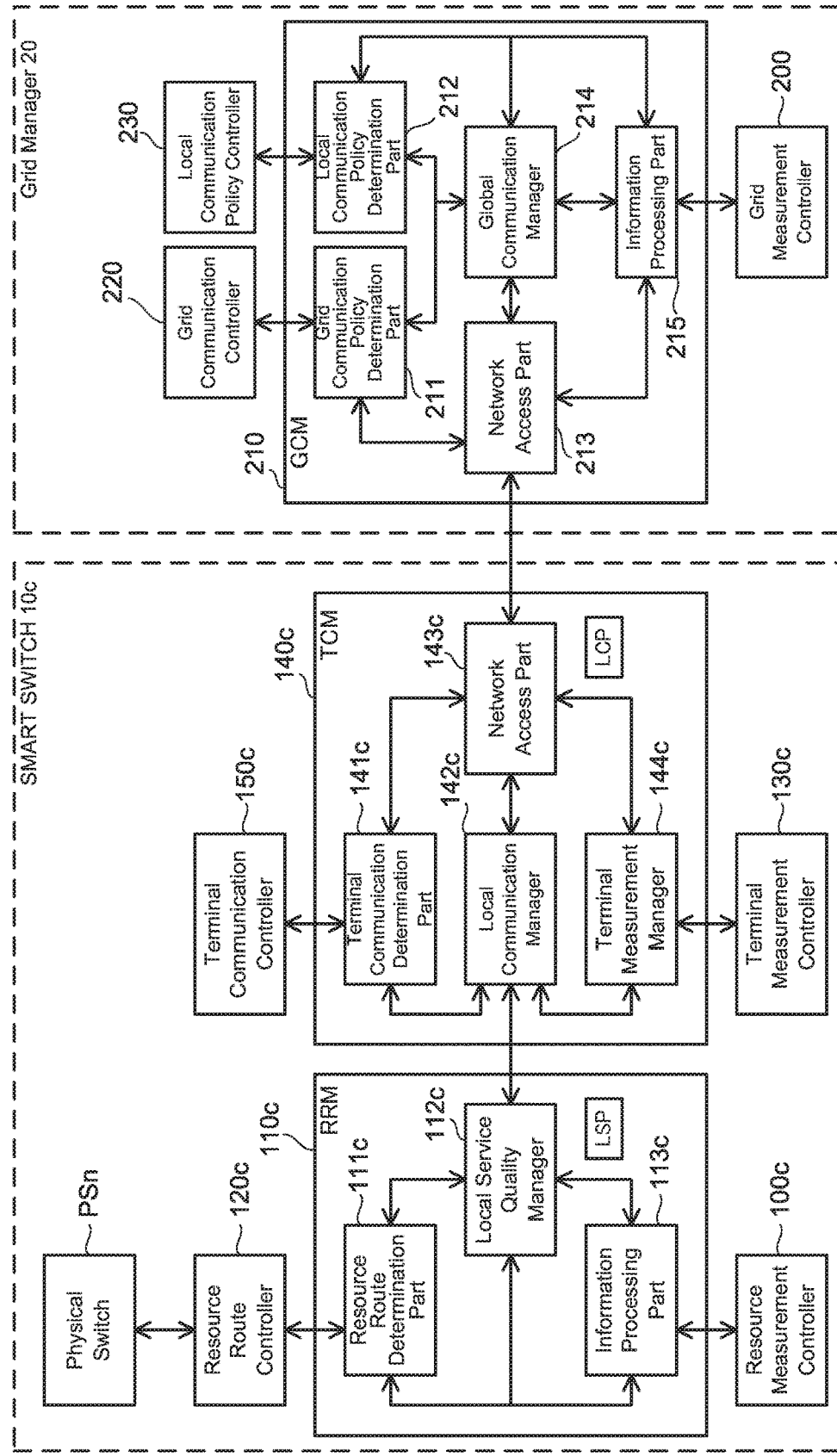
FIG. 5 A block diagram illustrating a functional configuration in a communication between the smart switch and a grid manager.

Subsequently, another operation of the resource management system of the embodiment is described with reference to FIGS. 5 and 6. As illustrated in FIG. 5, a resource route manager 110c includes a resource route determination part 111c, a local service quality manager 112c, and an information processing part 113c. Besides, a terminal communication manager 140c includes a terminal communication determination part 141c, a local communication manager 142c, a network access part 143c, and a terminal measurement manager 144c. Further, the grid communication manager 210 includes a grid communication policy determination part 211, a local communication policy determination part 212, a network access part 213, a grid communication manager 214, and an information processing part 215.

When the grid measurement controller 200 detects the voltage sag at a load 50e, a detection result is transmitted to the information processing part 215 of the grid communication manager 210.

The network access part 213 of the grid communication manager 210 transmits the detected voltage sag information to the subordinate smart switch 10c. The local communication manager 142c of the smart switch 10c receives the voltage sag information from the grid manager 20. The received voltage sag information is transmitted to the local service quality manager 112c.

The local service quality manager 112c notifies smart switches 10d, 10e of the voltage sag occurrence through the local communication manager 142c based on the received voltage sag information and the local service policy.

The resource route determination part 111c determines detachment of the power supply source (for example the power line 40) being the occurrence cause of the voltage sag, and notifies the resource route controller 120c.

The resource route controller 120c opens the physical switch PS3a and closes the physical switch PS3b in accordance with the notification, and switches the power supply to the load 50e from the power line 40 to a power generator 60c.

The resource route determination part 111c cooperates with the other smart switches 10d, 10e and determines the power supply route preparing for the voltage sag occurrence in accordance with an instruction from the local service quality manager 112c.

Figure 6:
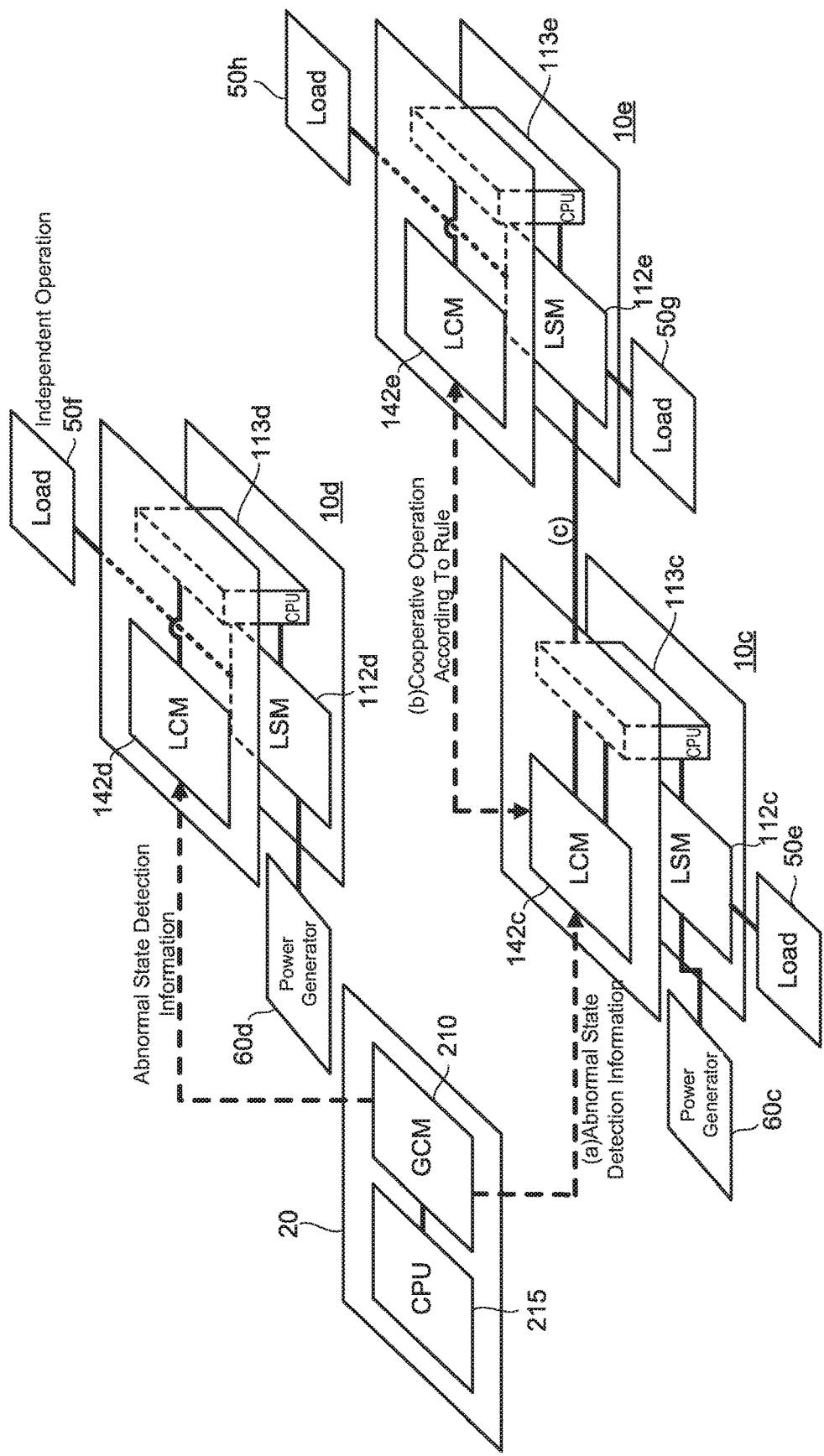
FIG. 6 A schematic view explaining operations when the grid manager detects a voltage sag.
Figure 7:
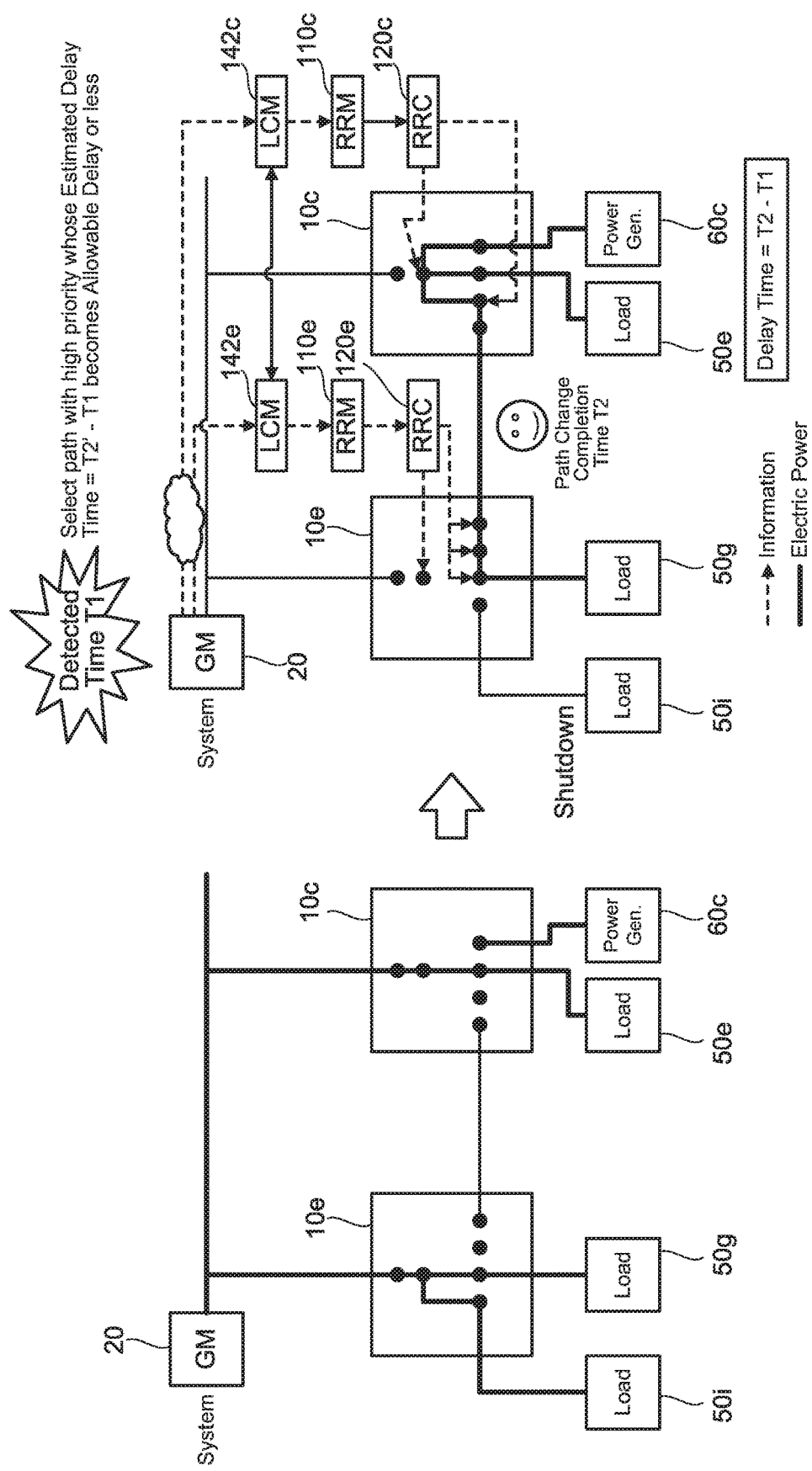
FIG. 7 A schematic view explaining the operations when the grid manager detects the voltage sag.

FIGS. 6 and 7 illustrate operation outlines of the operation example 2. As illustrated in FIG. 6, when the voltage sag information is transmitted from the grid manager 20 to the smart switch 10c (FIG. 6 (a)), the local communication manager 142c of the smart switch 10c and a local communication manager 142e of the smart switch 10e exchange the voltage sag information (the same drawing (b)). Next, the local service quality manager 112c and the local service quality manager 112e cooperate with each other, control respective physical switches, and supply the electric power of the power generator 60c not only to the load 50e but also to a load 50g and a load 50h (the same drawing (c)). Namely, the plurality of smart switches cooperate to change the power supply route.

Besides, as illustrated in FIG. 7, a time when the trouble such as the voltage sag is detected is set to T1, and an estimated time when the change of the power supply route is completed is set to T2, then the change of the power supply route is performed such that there is selected the power supply route where a delay time T2−T1 becomes the allowable delay time by each event illustrated in FIG. 3 or less. A communication path from the grid manager 20 to the smart switch 10c is also the same, and the grid communication controller 220 selects the communication path where the communication from the grid manager 20 to the smart switch 10c takes time which is sufficiently below the allowable delay time.

As stated above, according to the resource management system of the embodiment, the smart switches cooperate with each other to control the physical switches regarding an abnormal state detected by the grid manager, though this cooperative operation may be enabled through the grid manager, or the control may be enabled by the smart switch for itself by directly cooperate with the other smart switch.

(Operation Example 3 of Embodiment: Supply Route Construction by Specific Smart Switch)

Subsequently, another operation of the resource management system of the embodiment is described with reference to FIGS. 5 and 8.

Figure 8:
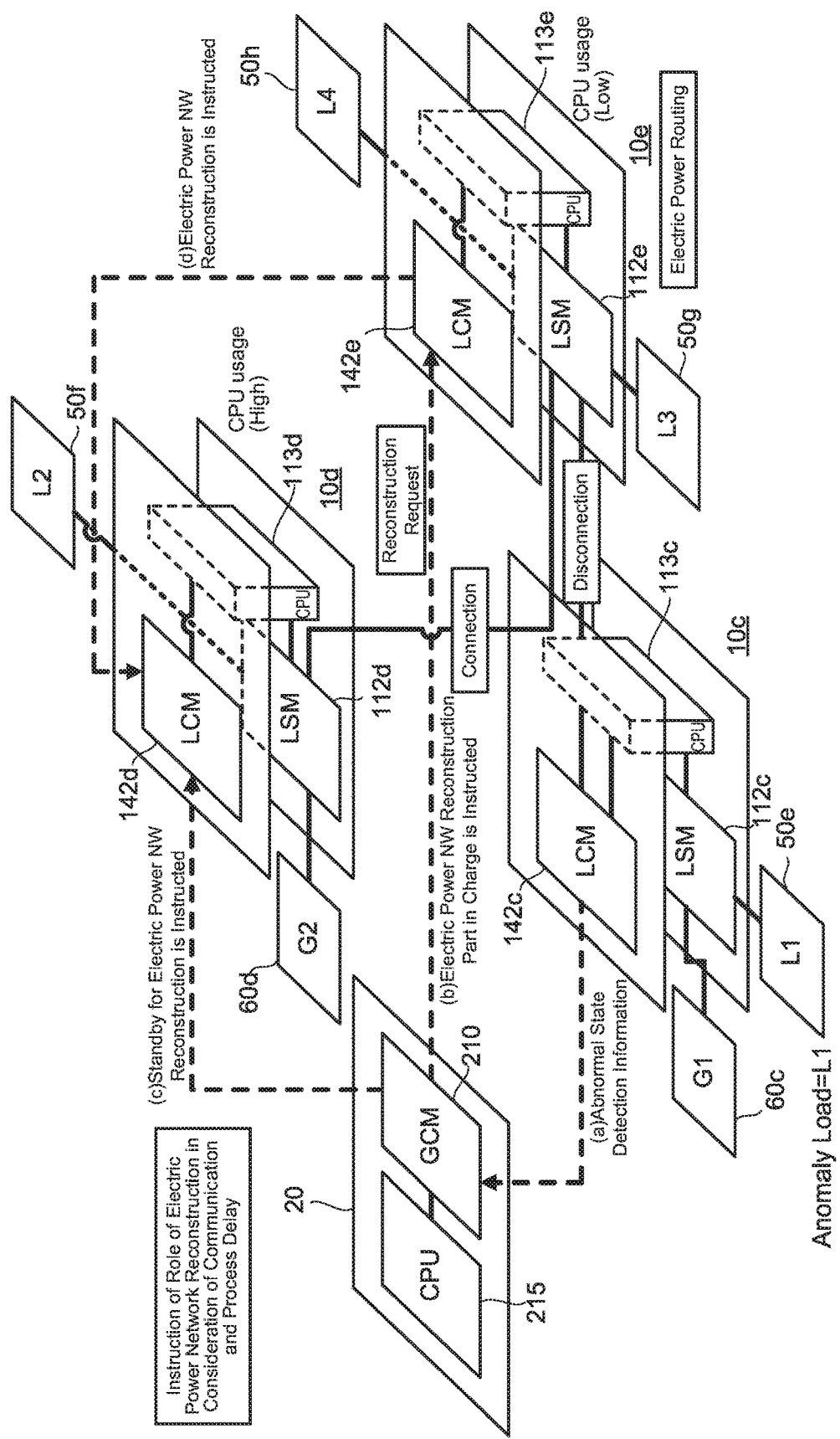
FIG. 8 A schematic view explaining operations when the smart switch detects a trouble of equipment.

When a resource measurement controller 100c detects failure (abnormal state) at a subordinate load (FIG. 8 (a)), a detection result is transmitted to the local service quality manager 112c through the information processing part 113c of the resource route manager 110c.

The local service quality manager 112c notifies the grid manager 20 of the equipment failure occurrence through the local communication manager 142c of the terminal communication manager 140c based on the local service policy.

When the notification of the equipment failure occurrence is received, the grid communication manager 210 of the grid manager 20 reconstructs a supply routing of the electric power. Specifically, the grid communication manager 210 selects a proper communication means (for example, a communication means capable of communicating within a minimum time in accordance with a congestion degree or the like of a usable channel and communication method) in accordance with an abnormal level of the equipment failure. Then the grid communication manager 210 reconstructs the electric power routing such that a power supply flow which enables the subordinate smart switches 10c to 10e to avoid problems.

At this time, when the information regarding the power supply route to each smart switch held by the grid communication manager 210 of the grid manager 20 is old information for a predetermined time or more (for example, 30 minutes ago), and when it is necessary to perform the path reconstruction by the plurality of smart switches cooperating with each other, the grid communication manager 210 selects the smart switch capable of performing recalculation of the power route in a minimum time, and instructs the reconstruction of the power supply route (FIG. 8 (b), (c)). In an example illustrated in FIG. 8, the grid communication manager 210 instructs the recalculation of the power supply route to the smart switch 10e whose CPU usage is low from among the subordinate smart switches.

The smart switch 10e which received the instruction performs a calculation to reconstruct the power supply route by using latest information held by the local communication manager 142e and the local service quality manager 112e of its own.

When the reconstruction process is completed, the smart switch performing the reconstruction instructs the change of the route for the smart switches where the change of the power supply route is necessary (the same drawing (d)).

The local communication manager 10d of the smart switch which receives the instruction passes the information relating to the route change to the local service quality manager 112d. The local service quality manager 112d reconstructs the power supply route based on the received information.

(Operation Example 4 of Embodiment: Change of Policy)

Figure 9:
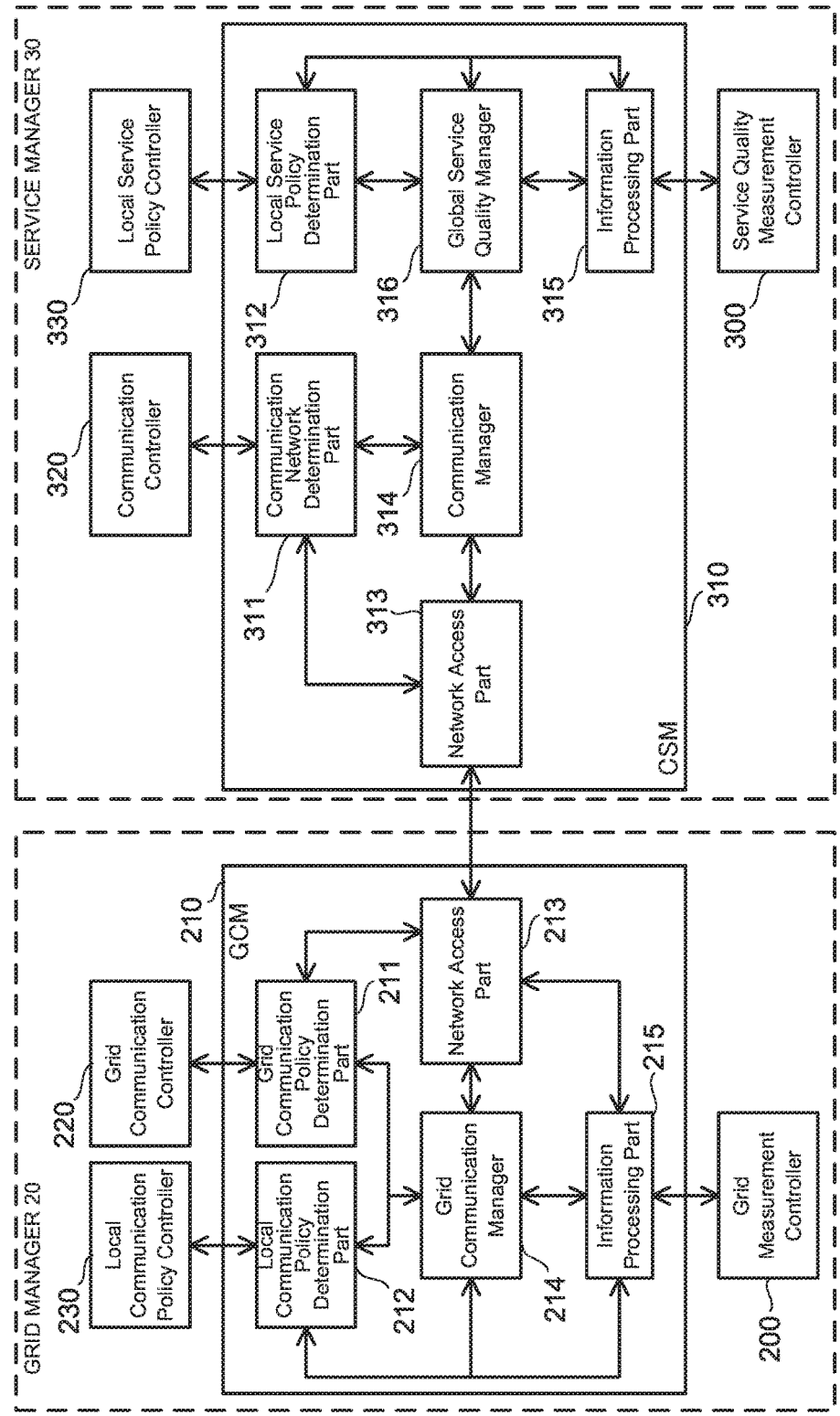
FIG. 9 A block diagram illustrating a functional configuration in a communication between the grid manager and a service manager.

Subsequently, another operation of the resource management system of the embodiment is described with reference to FIGS. 5 and 9. As illustrated in FIG. 9, the cloud service manager 310 includes a communication network determination part 311, a local service policy determination part 312, a network access part 313, a communication manager 314, a global service quality manager 316, and an information processing part 315.

When there is a power saving requirement for one of a plurality of grid managers 20, the grid manager 20 which received the power saving requirement transmits an adjusting request to the service manager 30 where the grid manager 20 belongs to.

The global service quality manager 316 of the service manager 30 which receives the adjusting request lets the local service policy determination part 312 create an optimum local service policy based on a state of the subordinate grid manager 20.

The global service quality manager 316 transmits the created local service policy to the grid manager 20 through the communication manager 314.

When the local service policy is received from the service manager 30, the grid communication manager of the grid manager 20 lets the local communication policy determination part 212 create a local communication policy which is suitable for the received local service policy.

The global communication manager 214 transmits the created local communication policy and the local service policy received from the service manager 30 to the subordinate smart switches.

When the local communication policy and the local service policy are received from the global communication manager 214 of the grid manager 20, the local service quality manager 112c applies the received local service policy, and the local communication manager 142c applies the received local communication policy.

When the received policies are applied, the resource route determination part 111c switches the power supply route according to need.

(Operation Example 5 of Embodiment: Use of Cloud)

Figure 10:
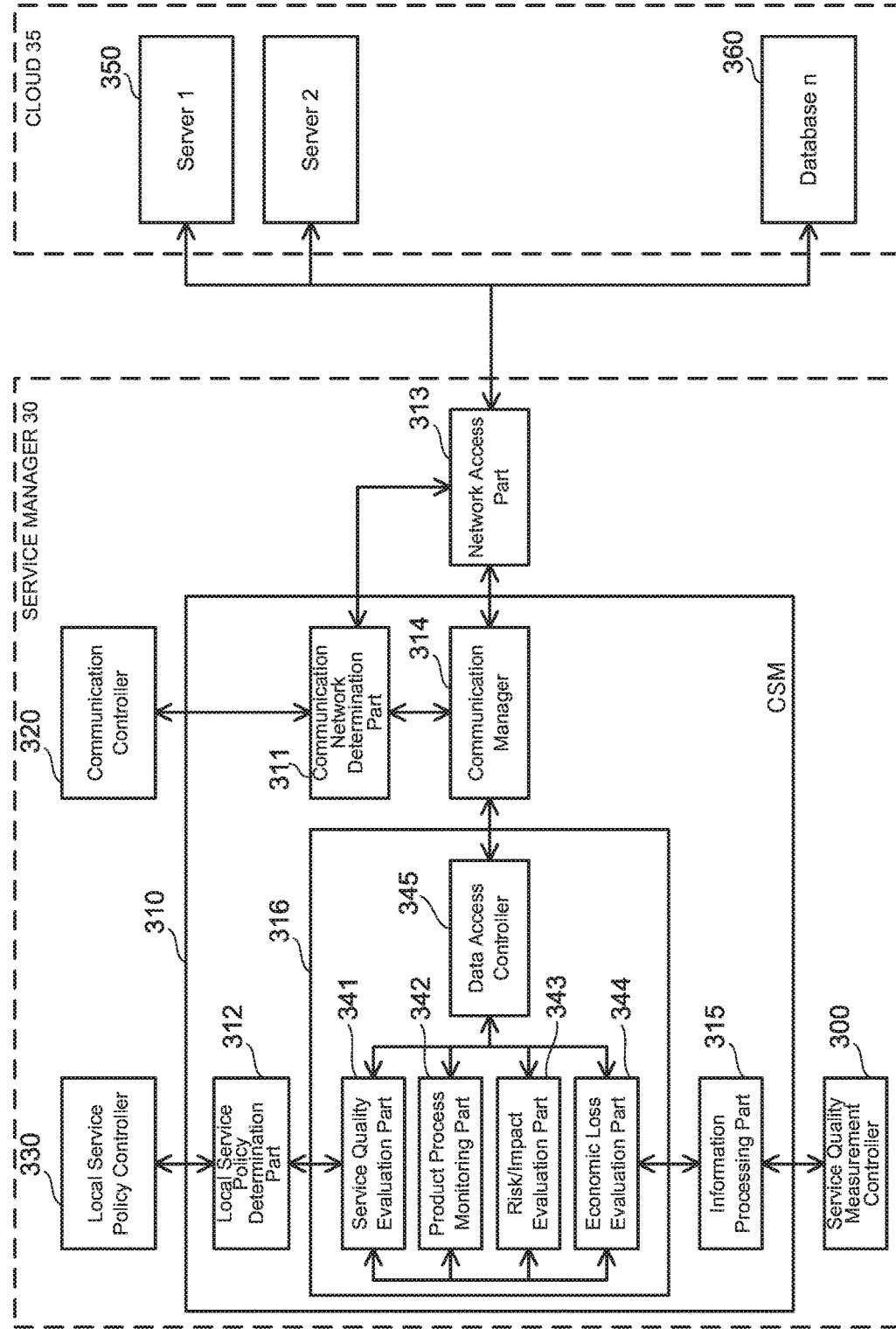
FIG. 10 A block diagram illustrating a functional configuration in a communication between the service manager and a cloud.

Subsequently, another operation of the resource management system of the embodiment is described with reference to FIGS. 5, 9, and 10. As illustrated in FIG. 10, the global service quality manager 316 includes a service quality evaluation part 341, a product process monitoring part 342, a risk/impact evaluation part 343, an economic loss evaluation part 344, and a data access controller 345.

The global service quality manager 316 of the service manager 30 refers to status information of production processes and lines at a management object plant or the like, and performs evaluation of impact exerted by the failure of the power supply. The global service quality manager 316 acquires the meteorological information and the thunder forecast information provided by meteorological government offices from the server 350 and the database 360 of the cloud 35 to perform the evaluation.

When it is judged that the change of the electric power flow is necessary as a result of the impact evaluation, the local service policy determination part 312 generates a new local service policy. The communication manager 314 transmits the generated local service policy to the grid manager 20.

The global communication manager 214 of the grid manager 20 transmits the new local service policy to the local service quality manager 112c of the smart switch 10c, and the local service quality manager 112c applies the received new local service policy.

Besides, the local communication policy determination part 212 of the grid manager 20 generates a local communication policy which satisfies the new local service policy. The global communication manager 214 transmits the generated new local communication policy to the local communication manager 142c of the smart switch 10c. The local communication manager 142c applies the new local communication policy.

The resource route determination part 111c performs reconstruction of the power supply route based on the new local service policy according to need.

As stated above, the resource management system of the embodiment disposes the plurality of smart switches for the management objects including the plurality of loads, the grid manager which manages the smart switches is hierarchically disposed, and both of the superior grid manager and the inferior smart switches monitor the troubles or the like of the power supply. According to the configuration as stated above, it is possible to flexibly correspond to the change of the power supply path even when it spreads for a wide range.

Besides, in the resource management system of the embodiment, the local service policy and the local communication policy to be the references of operations at the smart switch which is actually responsible for the change of the power supply route are able to be changed by the superior grid manager and service manager, and therefore, it is possible to flexibly perform the change of the supply path even when an object of the power supply management spreads for a wide range.

Besides, in the resource management system of the embodiment, the above-stated policy group is managed by the superior grid manager and service manager, and therefore, there is no need for an operator of a plant being the management object to manage the policies. This enables to leave the operation of the resource management to a third person, and it becomes possible to easily install the resource management system even when it is difficult to have a self-occupied network and management system such as small-to-medium sized companies and plants.

Further, in the resource management system of the embodiment, communication conditions of the communications among the smart switches, the grid manager, the service manager with each other are defined by the local communication policy and the global communication policy, and therefore, the communication paths can be set freely. Namely, it is possible to use not only a self-occupied communication network but also a telecommunication network provided by a third person. Besides, a plurality of communication paths are defined, and thereby, it becomes possible to freely select a communication path which enables to speed-up the switch control.

Some embodiments of the present invention are described, but these embodiments have been presented by way of examples only, and are not intended to limit the scope of the inventions. These novel embodiments may be embodied in a variety of other forms, and various omissions, substitutions and changes may be made without departing from the spirit of the inventions. These embodiments and modifications thereof are included in the scope and spirit of the inventions and included in the inventions described in the claims and their equivalents. For example, the resource management system of the embodiment performs the management of the power supply, but it is not limited thereto. It is possible to similarly apply to a target where a plurality of resource supply sources are used to enable a stable supply to a plurality of loads and places of demand, such as a gas supply and a water supply.

EXPLANATION OF REFERENCE SIGNS

1 ... resource management system, 10, 10a to 10e ... smart switch, 100, 100a to 100c ... resource measurement controller, 110, 110a to 110c ... resource route manager, 120, 120a to 120c ... resource route controller, 130, 130a to 130c ... terminal measurement controller, 140, 140a to 140c ... terminal communication manager, 150, 150a to 150c ... terminal communication controller, 20 ... grid manager, 200 ... grid measurement controller, 210 ... grid communication manager, 220 ... grid communication controller, 230 ... local communication policy controller, 30 ... service manager, 300 ... service quality measurement controller, 310 ... cloud service manager, 320 ... communication controller, 330 ... local service policy controller, 35 ... cloud, 350 ... server, 360 ... database, 40 ... power line, 42 ... network, 44 ... internet, 46 ... mobile network, 50a to 50h ... load, 60 ... power generator, 62a, 62b ... storage battery LSP ... local service policy, LCP ... local communication policy, PS1 to PS4 ... physical switch

What is claimed is:

1. A resource management system comprising:
a first opening/closing control mechanism comprising:
   a first opening/closing controller to transmit a first opening/closing signal for controlling opening/closing of a connection between a first resource supply source and a first load;
   a first monitor to monitor a trouble of the first resource supply source and the first load;
   a first storage to store a first policy defining the first opening/closing signal, classified based on a delay time allowable for opening/closing of the connection with respect to an object event between the first resource supply source and the first load; and
   a first path controller to generate the first opening/closing signal based on a monitoring result of the first monitor and the first policy;
a second opening/closing control mechanism comprising:
   a second opening/closing controller to transmit a second opening/closing signal for controlling opening/closing of a connection between a second resource supply source, which is different from the first resource supply source, and a second load;
   a second monitor to monitor a trouble of the second resource supply source and the second load;
   a second storage to store a second policy defining the second opening/closing signal classified based on a delay time allowable for opening/closing of the connection with respect to an object event between the second resource supply source and the second load; and
   a second path controller to generate the second opening/closing signal based on a monitoring result of the second monitor and the second policy; and
a grid manager comprising:
   a third monitor to monitor a trouble of the first resource supply source, the first load, the second resource supply source, and the second load;
   a third storage to store a third policy defining the first and second opening/closing signals classified based on a delay time allowable for opening/closing of the connections with respect to an object event between the first resource supply source and the first load, an object event between the second resource supply source and the second load, and a combination thereof; and
   a third path controller to generate at least one of the first and second opening/closing signals by controlling at least one of the first path controller and the second path controller based on a monitoring result of the third monitor and the third policy.

2. The resource management system according to claim 1, wherein:
the first storage further stores a fourth policy defining communication conditions between the second opening/closing control mechanism and the grid manager; and
the second storage further stores a fifth policy defining communication conditions between the first opening/closing control mechanism and the grid manager.

3. The resource management system according to claim 2, further comprising:
a service manager comprising:
   an information acquisition part to acquire, from outside, environmental information affecting a state of a resource supplied from the first resource supply source; and
   a policy generator to generate the first and second policies based on at least one of contents of the first and second loads, contents of the first and second resource supply sources, and the environmental information.

4. The resource management system according to claim 1, wherein the second path controller generates a third opening/closing signal for controlling opening/closing of a connection between the second resource supply source and the first load.

5. The resource management system according to claim 2, wherein the second path controller generates a third opening/closing signal for controlling opening/closing of a connection between the second resource supply source and the first load.

6. The resource management system according to claim 3, wherein the second path controller generates a third opening/closing signal for controlling opening/closing of a connection between the second resource supply source and the first load.

7. The resource management system according to claim 1, wherein:
the first path controller controls the connection between the first resource supply source and the first load through the first opening/closing signal upon a detection of a voltage sag at the first opening/closing control mechanism by the first monitor, and
the third path controller controls the connections between the first resource supply source and the first load and between the second resource supply source and the second load upon a detection of an equipment failure at the first opening/closing control mechanism or the second opening/closing control mechanism by the third monitor.

8. The resource management system according to claim 2, wherein:
the first path controller controls the connection between the first resource supply source and the first load through the first opening/closing signal upon a detection of a voltage sag at the first opening/closing control mechanism by the first monitor, and the third path controller controls the connections between the first resource supply source and the first load and between the second resource supply source and the second load upon a detection of an equipment failure at the first opening/closing control mechanism or the second opening/closing control mechanism by the third monitor.

9. The resource management system according to claim 3, wherein:

the first path controller controls the connection between the first resource supply source and the first load through the first opening/closing signal upon a detection of a voltage sag at the first opening/closing control mechanism by the first monitor, and the third path controller controls the connections between the first resource supply source and the first load and between the second resource supply source and the second load upon a detection of an equipment failure at the first opening/closing control mechanism or the second opening/closing control mechanism by the third monitor.

10. The resource management system according to claim 4, wherein:

the first path controller controls the connection between the first resource supply source and the first load through the first opening/closing signal upon a detection of a voltage sag at the first opening/closing control mechanism by the first monitor, and the third path controller controls the connections between the first resource supply source and the first load and between the second resource supply source and the second load upon a detection of an equipment failure at the first opening/closing control mechanism or the second opening/closing control mechanism by the third monitor.

11. The resource management system according to claim 5, wherein:

the first path controller controls the connection between the first resource supply source and the first load through the first opening/closing signal upon a detection of a voltage sag at the first opening/closing control mechanism by the first monitor, and the third path controller controls the connections between the first resource supply source and the first load and between the second resource supply source and the second load upon a detection of an equipment failure at the first opening/closing control mechanism or the second opening/closing control mechanism by the third monitor.

12. The resource management system according to claim 6, wherein:

the first path controller controls the connection between the first resource supply source and the first load through the first opening/closing signal upon a detection of a voltage sag at the first opening/closing control mechanism by the first monitor, and the third path controller controls the connections between the first resource supply source and the first load and between the second resource supply source and the second load upon a detection of an equipment failure at the first opening/closing control mechanism or the second opening/closing control mechanism by the third monitor.

13. A resource management system comprising:

a first opening/closing control mechanism comprising:

a first opening/closing controller to transmit a first opening/closing signal for controlling opening/closing of a connection between a first resource supply source and a first load;

a second opening/closing controller to transmit a second opening/closing signal for controlling opening/closing of a connection between a second resource supply source that is different from the first resource supply source and the first load;

a first monitor to monitor a trouble of the first resource supply source, the first load, and the second resource supply source;

a first storage to store a first policy defining the first and second opening/closing signals classified based on a delay time allowable for opening/closing of the connections with respect to an object event between the first resource supply source and the second resource supply source and the first load; and a first path controller to generate the first and second opening/closing signals based on a monitoring result of the first monitor and the first policy;

a second opening/closing control mechanism comprising:

a third opening/closing controller to transmit a third opening/closing signal for controlling opening/closing of a connection between the first resource supply source and a second load;

a fourth opening/closing controller to transmit a fourth opening/closing signal for controlling opening/closing of a connection between a third resource supply source that is different from the first resource supply source and the second load;

a second monitor to monitor a trouble of the first resource supply source, the second load, and the third resource supply source;

a second storage to store a second policy defining the third and fourth opening/closing signals classified based on a delay time allowable for opening/closing of the connection with respect to an object event between the first resource supply source and the third resource supply source and the second load; and a second path controller to generate the third and fourth opening/closing signals based on a monitoring result of the second monitor and the second policy; and a grid manager comprising:

a reception part to acquire at least one of the monitoring results of the first and second monitors;

a third storage to store a third policy defining the first and second opening/closing signals classified based on a delay time allowable for opening/closing of the connections with respect to an object event between the first resource supply source and the second resource supply source and the first load, an object event between the first resource supply source and the third resource supply source and the second load and, a combination thereof; and a third path controller to generate the first to fourth opening/closing signals by controlling at least one of the first path controller and the second path controller based on the at least one of the monitoring results received by the reception part.

14. The resource management system according to claim 13, wherein:

the first path controller opens the connection between the first resource supply source and the first load and closes the connection between the second resource supply source and the first load upon a detection of a power sag at the first opening/closing control mechanism by the first monitor, and the fourth path controller controls a connection between the third resource supply source and the first load upon a detection of an equipment failure at the first opening/closing control mechanism by the reception part.

* * * * *